(12) United States Patent
Ponemayr et al.

(10) Patent No.: US 6,861,161 B2
(45) Date of Patent: Mar. 1, 2005

(54) COMPOSITE TOOL

(75) Inventors: Helmut Ponemayr, Waidhofen (AT); Karl Leban, Wiener Neustadt (AT); Manfred Daxel Müller, Waidhofen (AT); Herbert Danninger, Vienna (AT)

(73) Assignee: Machner & Saurer GmbH, St. Marein (AU)

( * ) Notice: Subject to any disclaimer, the term of this patent is extended or adjusted under 35 U.S.C. 154(b) by 149 days.

(21) Appl. No.: 10/296,908

(22) PCT Filed: May 30, 2001

(86) PCT No.: PCT/AT01/00173

§ 371 (c)(1),
(2), (4) Date: Feb. 13, 2003

(87) PCT Pub. No.: WO01/91962

PCT Pub. Date: Dec. 6, 2001

(65) Prior Publication Data

US 2004/0101431 A1 May 27, 2004

(30) Foreign Application Priority Data

Jun. 2, 2000 (AT) ............................................ 974/2000

(51) Int. Cl.[7] .......................... B32B 15/18; B23D 61/00
(52) U.S. Cl. ...................... 428/681; 30/166.3; 30/345; 76/101.1; 76/112; 83/929; 428/682; 428/683; 428/684; 428/685; 428/686; 428/932
(58) Field of Search ................................ 428/681, 682, 428/683, 684, 685, 686, 932; 30/166.3, 345; 76/101.1, 112; 83/929

(56) References Cited

U.S. PATENT DOCUMENTS

| | | | |
|---|---|---|---|
| 4,036,640 A | 7/1977 | Philip et al. ................. | 420/102 |
| 4,628,178 A | 12/1986 | Miyake et al. ......... | 219/121.64 |
| 5,015,539 A | 5/1991 | Daxelmueller et al. ..... | 428/685 |
| 5,091,264 A | 2/1992 | Daxelmueller et al. ..... | 428/685 |

FOREIGN PATENT DOCUMENTS

| | | |
|---|---|---|
| AT | 398985 | 2/1995 |
| DE | 2757639 | 6/1979 |
| DE | 4445755 | 9/1995 |
| EP | 0319511 | 6/1989 |
| EP | 0377307 | 7/1990 |
| JP | 61180637 | 8/1986 |
| JP | 62224529 | 10/1987 |
| JP | 3-111541 | 5/1991 |

OTHER PUBLICATIONS

English Language Abstract of JP 62–224529.

English Language Abstract of JP 61–180637.

English Language Abstract of DE 4445755.

English Language Abstract of AT 398985.

English Language Abstract of JP 3–111541.

Primary Examiner—Robert R. Koehler
(74) Attorney, Agent, or Firm—Greenblum & Bernstein, P.L.C.

(57) ABSTRACT

A composite tool comprising a supporting part of a metallic material having a first composition and a working part of a metallic material having a second composition which is different from the first composition, a process for the manufacture thereof and a method of cutting an austenic alloy article with this composite tool. The supporting part of the composite tool is made of a tenacious iron-based material, and the working part is made of a precipitation harden iron-cobalt-tungsten alloy. The parts are joined by a metallic connection.

42 Claims, No Drawings

COMPOSITE TOOL

CROSS-REFERENCE TO RELATED APPLICATIONS

The present application is a U.S. National Stage of International Application No. PCT/AT01/00173, filed May 30, 2001, which claims priority under 35 U.S.C. § 119 of Austrian Patent Application No. A 974/2000, filed Jun. 2, 2000.

BACKGROUND OF THE INVENTION

1. Field of the Invention

The invention relates to a composite tool comprising a metallic supporting part and at least one such working part of different material compositions, which parts are metallically joined together, in particular a saw blade or a bandsaw.

2. Discussion of Background Information

Tools on which the highest demands are made regarding the working part and the holding part or clamping part are usually made of different materials, with the respective material being selected to be the best possible for the strains on the part.

It is known to make saw blades or bandsaws out of a so-called bimetal strip, which strip is formed of a tenacious supporting part and a cutting part. While the supporting part is made of an alloy that ensures high elasticity, toughness, fracture-resistance and the like properties, the cutting part, which ultimately forms the cutting tooth tips, features a high material hardness, abrasion resistance and a like wear-resistance. Such saws have been part of the prior art for a long time, and the cutting part, formed, e.g., of high-speed steel, may be metallically bonded to the carrying or supporting part by welding. If, according to another possibility, the cutting tips are made of special materials, e.g., hard metal, they are to be bonded to the supporting part individually, in particular by brazing.

In the cutting of materials, the hardness, toughness and abrasion resistance of the tool blade usually determine the service life thereof in practical use. Hard material coatings are also often provided in the blade area of the tools in order to increase their cutting yields.

However, the cutting yield of cutting tools depends not only on the hardness of the blades and their abrasion resistance and toughness, but is also considerably influenced by the properties of the material to be cut. For instance, titanium, austenitic steels, nickel-based alloys and the like are known as materials that are difficult to cut. In a treatment of the above materials, it is often only possible to achieve low cutting yields with extremely high tool wear, even with high quality high-speed steels and hard metals. Roundnesses and craters in the blade area are usually the cause of the failure of the tool.

The invention is intended to remedy this situation, the object being to disclose a composite tool that has improved cutting properties of the working part. It is, in particular, the object of the invention to provide a tool for cutting titanium and titanium alloys, austenitic steels, nickel- and cobalt-based alloys and the like.

SUMMARY OF THE INVENTION

These objects are attained with a composite tool of the type mentioned at the outset in that the supporting part or the supporting strip is made of a tenacious iron-based material and the working part(s) are made of a precipitation hardenable iron-cobalt-tungsten alloy (Fe—Co—W). It has been found that tungsten can be replaced at least in part by molybdenum, and that improved cutting yields may possibly be achieved with iron-cobalt-tungsten plus molybdenum alloys (Fe—Co—W+Mo).

Accordingly, the present invention provides a composite tool which comprises a supporting part of a metallic material having a first composition and at least one working part of a metallic material having a second composition which is different from the first composition. The supporting part is made of a tenacious iron-based material and the at least one working part is made of a precipitation hardenable iron-cobalt-tungsten alloy, and these parts are joined by a metallic connection.

In one aspect of the composite tool of the present invention, the at least one working part has the following composition, in % by weight: cobalt (Co) 15 to 30; tungsten (W) up to 25; molybdenum (Mo) up to 20; (W+Mo) 10 to 25; silicon (Si) up to 1.5; aluminum (Al) up to 1.5; vanadium (V) up to 1.5; titanium (Ti) up to 1.0; niobium/tantalum (Nb, Ta) up to 1.1; carbon (C) not more than 0.4; chromium (Cr) not more than 3.9; nickel (Ni) not more than 3.9; manganese (Mn) not more than 4.1. The balance of the composition comprises iron (Fe) and production-related impurities.

In another aspect, the at least one working part of the composite tool has the following composition, in % by weight: Co 21 to 26; W up to 20; Mo up to 12; (W+Mo) 11 to 20; Si up to 0.8; Al up to 0.8; V up to 1.0; Ti up to 0.6; Nb/Ta up to 0.7; C not more than 0.2; Cr not more than 0.9; Ni not more than 0.8; Mn not more than 0.9; the balance being Fe and production-related impurities.

In yet another aspect, the at least one working part has the following composition, in % by weight: Co 22 to 24; W 9 to 18; Mo 1 to 9; (W+Mo) 11 to 20; Si up to 0.6; Al up to 0.4; V 0.4 to 0.8; Ti up to 0.3; Nb/Ta up to 0.25; C not more than 0.15; Cr not more than 0.5; Ni not more than 0.3; Mn not more than 0.4; the balance being Fe and production-related impurities.

In another aspect of the composite tool, the supporting part is made of a carbon spring steel. For example, the carbon spring steel may comprise C, Si and Mn in the following weight percentages: C 0.25 to 1.15; Si 0.20 to 3.0; and Mn 0.45 to 2.5; with the balance being Fe, Cr, V, Mo, Ni and S and impurities caused by smelting.

In another aspect of the composite tool, the supporting part is made of a maraging steel. For example, the maraging steel may comprise, in percent by weight: Mo 2.0 to 8.2; Ni 14.0 to 22.0; Co 5.0 to 14.0; Ti 0.2 to 1.7; Al 0.05 to 0.2; the balance being Fe and impurities caused by smelting.

In a still further aspect of the composite tool, the metallic connection between the supporting part and the at least one working part is made by electron beam, laser and/or plasma welding. In yet another aspect, the at least one working part is made by powder metallurgy.

Furthermore, in another aspect of the composite tool, the at least one working part comprises granular and/or spherical hard material phases in a proportion of up to 10 percent by volume.

In another aspect of the composite tool, the composite tool is a saw blade or a bandsaw.

The present invention also provides a process for the manufacture of a composite tool that comprises a supporting part and at least one working part. According to this process, a supporting part made of a tenacious iron-based material and at least one working part made of a precipitation hardenable iron-cobalt-tungsten alloy are joined by a metallic connection. The composite tool may, for example, be a saw blade or a bandsaw.

In one aspect of the process, the at least one working part has one of the compositions indicated above with respect to the composite tool of the present invention.

In another aspect of the process, the supporting part is made of a carbon spring steel or a maraging steel. Exemplary compositions of the carbon spring steel and the maraging steel are those given above for the composite tool of the present invention.

In yet another aspect of the process, the metallic connection between the supporting part and the at least one working part is made by electron beam, laser and/or plasma welding.

Additionally, the present invention provides a method of cutting an article comprising an austenitic alloy, wherein the article is cut with a composite tool according to the present invention as discussed above.

In one aspect of the method, the austenitic alloy comprises an austenitic steel.

The advantages achieved with the invention can be seen essentially in that high cutting yields with considerably improved service life of the tool blade are possible even in austenitic steels, titanium—and nickel—as well as cobalt-based alloys. Here, the working part is advantageously bonded to the supporting part of the tool metallically, preferably by additive-free welding. It has not yet been scientifically determined why a precipitation-hardened iron-cobalt-tungsten alloy can particularly efficiently be effective in cutting materials that are known to be difficult to work on, e.g., Cr—Ni steel with more than 18% by weight of Cr and more than 10% by weight of nickel, which steel may additionally be alloyed with molybdenum, nitrogen and further elements. Initial studies indicate that a chip formation and a chip flow have a favorable effect by reducing the frictional forces while intensifying the tearing and shearing work.

High cutting yields of the tool can be achieved when the working part(s) has a composition in % by weight of

| | |
|---|---|
| Cobalt (Co) | 15 to 30 |
| Tungsten (W) | up to 25 |
| Molybdenum (Mo) | up to 20 |
| (W + Mo) | 10 to 25 |
| Silicon (Si) | up to 1.5 |
| Aluminum (Al) | up to 1.5 |
| Vanadium (V) | up to 1.5 |
| Titanium (Ti) | up to 1.0 |
| Niobium/Tantalum (Nb, Ta) | up to 1.1 |
| Carbon (C) | a maximum of 0.4 |
| Chromium (Cr) | a maximum of 3.9 |
| Nickel (Ni) | a maximum of 3.9 |
| Manganese (Mn) | a maximum of 4.1 | the balance being iron (Fe) and impurities caused by production. In the above alloying range the material properties regarding material hardness, toughness and abrasion resistance can be adjusted in a favorable manner by a heat treatment and the precipitation hardening effect, respectively, without adversely affecting the welding behavior of the working part and the connection with the supporting part, respectively.

Particularly high cutting yields with low tool wear can be achieved when the working part(s) has/have a composition in % by weight of

| | |
|---|---|
| Co | 22 to 26, preferably 21 to 24 |
| W | up to 20, preferably 9 to 18 |
| Mo | up to 12, preferably 1 to 9 |
| (W + Mo) | 11 to 20 |
| Si | up to 0.8, preferably up to 0.6 |
| Al | up to 0.8, preferably up to 0.4 |
| V | up to 1.0, preferably 0.4 to 0.8 |
| Ti | up to 0.6, preferably up to 0.3 |
| Nb/Ta | up to 0.7, preferably up to 0.25 |
| C | a maximum of 0.2, preferably a maximum of 0.15 |
| Cr | a maximum of 0.9, preferably a maximum of 0.5 |
| Ni | a maximum of 0.8, preferably a maximum of 0.3 |
| Mn | a maximum of 0.9, preferably a maximum of 0.4 | the balance being Fe and impurities caused by production.

As has been found, the preferred ranges of the material composition can be favorably used for the working part when cutting austenitic work pieces.

In order to achieve improvements regarding good performance qualities of the tool per se, it can be favorable if the supporting part is made of a carbon spring steel consisting of, in % by weight, 0.25 to 1.15 C
0.20 to 3.0 Si
0.45 to 2.5 Mn as well as Cr, V, Mo, Ni and S, Fe and impurities caused by smelting as the balance.

If particularly high demands are made on the supporting part regarding hardness, alternating bending strength and weldability with the working area, it can be advantageous for the supporting part to be made of a maraging steel consisting essentially of, in % by weight, Mo 2.0 to 8.2
Ni 14.0 to 22.0
Co 5.0 to 14.0
Ti 0.2 to 1.7
Al 0.05 to 0.2 the balance being Fe and impurities caused by smelting.

With the above material for the support, as it has turned out, the welding seam is hard and tenacious over the entire cross section; no brittle phases have been detected and a particularly favorable heat treatment technology can be used that is adjustable to both tool parts.

If furthermore the metallic connection between the supporting part and the working part is made in a favorable manner by electron, laser or plasma welding, the material properties can be improved transversely over the connection zone and can feature high values.

In terms of manufacturing, but also with regard to an increased material quality bility for heat treatment, it may be preferred for the working part(s) to be made by powder metallurgy.

If, as can further be provided according to the invention, the working part(s) feature(s) granular or spherical hard material phases, it is possible to increase the service life of the tools for certain demands. However, proportions of hard material of more than 10% by volume in the working part cause it to become brittle.

DETAILED DESCRIPTION OF THE INVENTION

The invention will be described in more detail with reference to an example.

A bandsaw having a thickness of 1.2 mm was made by welding a working part onto a supporting part by laser welding. The supporting part had a chemical composition in % by weight of essentially 0.43 C, 0.75 Si, 0.9 Mn, 1.2 Cr, the balance being iron and impurities caused by manufacture. The working part had a material composition in % by weight of 0.06 C, 20.1 Co, 15.3 W, 2.2 Mo, 0.31 Si, 0.38 V, the balance being iron and impurities. The material for the support was manufactured by powder metallurgy using metal atomization with nitrogen, hot isostatic pressing and hot forming of the blank.

Tooth spaces were made in the bimetal strip such that the tooth tip areas were out of the working part.

A solution annealing of the working part was carried out at 1220 to 1270° C., the hardening of the cutting material was conducted at 580 to 650° C., whereby a material hardness of 67 to 68 HRC was achieved.

In practical use, when cutting 18/10 CrNi rods with a diameter of 210 mm, the saw according to the invention afforded a cutting time reduction of 53%.

What is claimed is:

1. A composite tool comprising a supporting part of a metallic material having a first composition and at least one working part of a metallic material having a second composition which is different from the first composition, which parts are joined by a metallic connection, wherein the supporting part is made of a tenacious iron-based material and the at least one working part is made of a precipitation hardenable iron-cobalt-tungsten alloy.

2. The composite tool of claim 1, wherein the at least one working part comprises, in % by weight:

| | |
|---|---|
| Cobalt (Co) | 15 to 30 |
| Tungsten (W) | up to 25 |
| Molybdenum (Mo) | up to 20 |
| (W + Mo) | 10 to 25 |
| Silicon (Si) | up to 1.5 |
| Aluminum (Al) | up to 1.5 |
| Vanadium (V) | up to 1.5 |
| Titanium (Ti) | up to 1.0 |
| Niobium/Tantalum (Nb, Ta) | up to 1.1 |
| Carbon (C) | not more than 0.4 |
| Chromium (Cr) | not more than 3.9 |
| Nickel (Ni) | not more than 3.9 |
| Manganese (Mn) | not more than 4.1; | the balance being iron (Fe) and production-related impurities.

3. The composite tool of claim 1, wherein the at least one working part comprises, in % by weight:

| | |
|---|---|
| Co | 21 to 26 |
| W | up to 20 |
| Mo | up to 12 |
| (W + Mo) | 11 to 20 |
| Si | up to 0.8 |
| Al | up to 0.8 |
| V | up to 1.0 |
| Ti | up to 0.6 |
| Nb/Ta | up to 0.7 |
| C | not more than 0.2 |
| Cr | not more than 0.9 |
| Ni | not more than 0.8 |
| Mn | not more than 0.9; | the balance being Fe and production-related impurities.

4. The composite tool of claim 1, wherein the at least one working part comprises, in % by weight:

| | |
|---|---|
| Co | 22 to 24 |
| W | 9 to 18 |
| Mo | 1 to 9 |
| (W + Mo) | 11 to 20 |
| Si | up to 0.6 |
| Al | up to 0.4 |
| V | 0.4 to 0.8 |
| Ti | up to 0.3 |
| Nb/Ta | up to 0.25 |
| C | not more than 0.15 |
| Cr | not more than 0.5 |
| Ni | not more than 0.3 |
| Mn | not more than 0.4; | the balance being Fe and production-related impurities.

5. The composite tool of claim 3, wherein the at least one working part comprises one or more elements in the following concentrations, in percent by weight:

| | |
|---|---|
| Co | 22 to 24 |
| W | 9 to 18 |
| Mo | 1 to 9 |
| (W + Mo) | 11 to 20 |
| Si | up to 0.6 |
| Al | up to 0.4 |
| V | 0.4 to 0.8 |
| Ti | up to 0.3 |
| Nb/Ta | up to 0.25 |
| C | not more than 0.15 |
| Cr | not more than 0.5 |
| Ni | not more than 0.3 |
| Mn | not more than 0.4. |

6. The composite tool of claim 1 wherein the supporting part is made of a carbon spring steel.

7. The composite tool of claim 6, wherein the carbon spring steel comprises, in percent by weight:

| | |
|---|---|
| C | 0.25 to 1.15 |
| Si | 0.20 to 3.0 |
| Mn | 0.45 to 2.5; | the balance being Fe, Cr, V, Mo, Ni and S and impurities caused by smelting.

8. The composite tool of claim 2, wherein the supporting part is made of a carbon spring steel comprising, in percent by weight:

| | |
|---|---|
| C | 0.25 to 1.15 |
| Si | 0.20 to 3.0 |
| Mn | 0.45 to 2.5; | the balance being Fe, Cr, V, Mo, Ni and S and impurities caused by smelting.

9. The composite tool of claim 4, wherein the supporting part is made of a carbon spring steel comprising, in percent by weight:

| | |
|---|---|
| C | 0.25 to 1.15 |
| Si | 0.20 to 3.0 |
| Mn | 0.45 to 2.5; | the balance being Fe, Cr, V, Mo, Ni and S and impurities caused by smelting.

10. The composite tool of claim 1, wherein the supporting part is made of a maraging steel.

11. The composite tool of claim 10, wherein the maraging steel comprises, in percent by weight:

| | |
|---|---|
| Mo | 2.0 to 8.2 |
| Ni | 14.0 to 22.0 |
| Co | 5.0 to 14.0 |
| Ti | 0.2 to 1.7 |
| Al | 0.05 to 0.2; | the balance being Fe and impurities caused by smelting.

12. The composite tool of claim 2, wherein the supporting part is made of a maraging steel comprising, in percent by weight:

| | |
|---|---|
| Mo | 2.0 to 8.2 |
| Ni | 14.0 to 22.0 |
| Co | 5.0 to 14.0 |
| Ti | 0.2 to 1.7 |
| Al | 0.05 to 0.2; | the balance being Fe and impurities caused by smelting.

13. The composite tool of claim 4, wherein the supporting part is made of a maraging steel comprising, in percent by weight:

| | |
|---|---|
| Mo | 2.0 to 8.2 |
| Ni | 14.0 to 22.0 |
| Co | 5.0 to 14.0 |
| Ti | 0.2 to 1.7 |
| Al | 0.05 to 0.2; | the balance being Fe and impurities caused by smelting.

14. The composite tool of claim 1, wherein the metallic connection between the supporting part and the at least one working part is made by at least one of electron beam, laser and plasma welding.

15. The composite tool of claim 2, wherein the metallic connection between the supporting part and the at least one working part is made by at least one of electron beam, laser and plasma welding.

16. The composite tool of claim 8, wherein the metallic connection between the supporting part and the at least one working part is made by at least one of electron beam, laser and plasma welding.

17. The composite tool of claim 12, wherein the metallic connection between the supporting part and the at least one working part is made by at least one of electron beam, laser and plasma welding.

18. The composite tool of claim 1, wherein the at least one working part is made by powder metallurgy.

19. The composite tool of claim 2, wherein the at least one working part is made by powder metallurgy.

20. The composite tool of claim 4, wherein the at least one working part is made by powder metallurgy.

21. The composite tool of claim 1, wherein the at least one working part comprises one of granular and spherical hard material phases in a proportion of up to 10 percent by volume.

22. The composite tool of claim 2, wherein the at least one working part comprises one of granular and spherical hard material phases in a proportion of up to 10 percent by volume.

23. The composite tool of claim 20, wherein the at least one working part comprises one of granular and spherical hard material phases in a proportion of up to 10 percent by volume.

24. The composite tool of claim 1, wherein the composite tool comprises one of a saw blade and a bandsaw.

25. The composite tool of claim 2, wherein the composite tool comprises one of a saw blade and a bandsaw.

26. The composite tool of claim 8, wherein the composite tool comprises one of a saw blade and a bandsaw.

27. The composite tool of claim 12, wherein the composite tool comprises one of a saw blade and a bandsaw.

28. A process for the manufacture of a composite tool comprising a supporting part and at least one working part, which process comprises joining a supporting part made of a tenacious iron-based material and at least one working part made of a precipitation hardenable iron-cobalt-tungsten alloy by a metallic connection.

29. The process of claim 28, wherein the at least one working part comprises, in % by weight:

| | |
|---|---|
| Cobalt (Co) | 15 to 30 |
| Tungsten (W) | up to 25 |
| Molybdenum (Mo) | up to 20 |
| (W + Mo) | 10 to 25 |
| Silicon (Si) | up to 1.5 |
| Aluminum (Al) | up to 1.5 |
| Vanadium (V) | up to 1.5 |
| Titanium (Ti) | up to 1.0 |
| Niobium/Tantalum (Nb, Ta) | up to 1.1 |
| Carbon (C) | not more than 0.4 |
| Chromium (Cr) | not more than 3.9 |
| Nickel (Ni) | not more than 3.9 |
| Manganese (Mn) | not more than 4.1; | the balance being iron (Fe) and production-related impurities.

30. The process of claim 29, wherein the supporting part is made of a carbon spring steel comprising, in percent by weight:

| | |
|---|---|
| C | 0.25 to 1.15 |
| Si | 0.20 to 3.0 |
| Mn | 0.45 to 2.5; | the balance being Fe, Cr, V, Mo, Ni and S and impurities caused by smelting.

31. The process of claim 29, wherein the supporting part is made of a maraging steel comprising, in percent by weight:

| | |
|---|---|
| Mo | 2.0 to 8.2 |
| Ni | 14.0 to 22.0 |
| Co | 5.0 to 14.0 |
| Ti | 0.2 to 1.7 |
| Al | 0.05 to 0.2; | the balance being Fe and impurities caused by smelting.

32. The process of claim 29, wherein the metallic connection between the supporting part and the at least one working part is made by at least one of electron beam, laser and plasma welding.

33. The process of claim 30, wherein the metallic connection between the supporting part and the at least one working part is made by at least one of electron beam, laser and plasma welding.

34. The process of claim 31, wherein the metallic connection between the supporting part and the at least one working part is made by at least one of electron beam, laser and plasma welding.

35. The process of claim 28, wherein the composite tool comprises at least one of a saw blade and a bandsaw.

36. The process of claim 29, wherein the composite tool comprises at least one of a saw blade and a bandsaw.

37. A method of cutting an article comprising an austenitic alloy, wherein the article is cut with a composite tool comprising a supporting part made of a tenacious iron-based material and at least one working part made of a precipitation hardenable iron-cobalt-tungsten alloy, the supporting part and the at least one working part being joined by a metallic connection.

38. The method of claim 37, wherein the austenitic alloy comprises an austenitic steel.

39. The method of claim 37, wherein the composite tool comprises at least one of a saw blade and a bandsaw.

40. The method of claim 39, wherein the at least one working part comprises, in % by weight:

| Cobalt (Co) | 15 to 30 |
| Tungsten (W) | up to 25 |
| Molybdenum (Mo) | up to 20 |
| (W + Mo) | 10 to 25 |
| Silicon (Si) | up to 1.5 |
| Aluminum (Al) | up to 1.5 |
| Vanadium (V) | up to 1.5 |
| Titanium (Ti) | up to 1.0 |
| Niobium/Tantalum (Nb, Ta) | up to 1.1 |
| Carbon (C) | not more than 0.4 |
| Chromium (Cr) | not more than 3.9 |
| Nickel (Ni) | not more than 3.9 |
| Manganese (Mn) | not more than 4.1; | the balance being iron (Fe) and production-related impurities.

41. The method of claim 40, wherein the supporting part is made of a carbon spring steel comprising, in percent by weight:

| C | 0.25 to 1.15 |
| Si | 0.20 to 3.0 |
| Mn | 0.45 to 2.5; | the balance being Fe, Cr, V, Mo, Ni and S and impurities caused by smelting.

42. The method of claim 40, wherein the supporting part is made of a maraging steel comprising, in percent by weight:

| Mo | 2.0 to 8.2 |
| Ni | 14.0 to 22.0 |
| Co | 5.0 to 14.0 |
| Ti | 0.2 to 1.7 |
| Al | 0.05 to 0.2; | the balance being Fe and impurities caused by smelting.

* * * * *